United States Patent
Trönnberg et al.

(10) Patent No.: US 9,903,460 B2
(45) Date of Patent: Feb. 27, 2018

(54) TRANSMISSION WITH PINION FOR REDUCED BACKLASH

(71) Applicant: e-AAM Driveline Systems AB, Trollhättan (SE)

(72) Inventors: Gabriel Trönnberg, Trollhättan (SE); Thomas Bengtsson, Trollhättan (SE)

(73) Assignee: e-AAM Driveline Systems AB, Trollhättan (SE)

( * ) Notice: Subject to any disclaimer, the term of this patent is extended or adjusted under 35 U.S.C. 154(b) by 166 days.

(21) Appl. No.: 14/689,126

(22) Filed: Apr. 17, 2015

(65) Prior Publication Data
US 2016/0305529 A1 Oct. 20, 2016

(51) Int. Cl.
*F16H 55/18* (2006.01)
*F16H 48/36* (2012.01)

(52) U.S. Cl.
CPC ....... *F16H 55/18* (2013.01); *F16H 2048/364* (2013.01)

(58) Field of Classification Search
CPC .. F16H 55/18; F16H 1/2863; F16H 2048/364; F16H 2057/127; F16H 3/22; F16H 57/043
USPC ............ 74/440, 409, 432, 445, 413, 411
See application file for complete search history.

(56) References Cited

U.S. PATENT DOCUMENTS

| | | | | |
|---|---|---|---|---|
| 4,559,023 A | * | 12/1985 | Uchibaba | F16H 57/0006 464/30 |
| 4,660,432 A | * | 4/1987 | Damas | F16H 55/18 464/85 |
| 5,588,328 A | | 12/1996 | Nihei et al. | |
| 8,663,051 B2 | | 3/2014 | Sten | |
| 8,893,572 B2 | | 11/2014 | Wu et al. | |
| 2004/0089089 A1 | | 5/2004 | Stevens et al. | |
| 2013/0145875 A1 | | 6/2013 | Wu et al. | |
| 2013/0199323 A1 | | 8/2013 | Fong et al. | |
| 2014/0364264 A1 | | 12/2014 | Sten | |
| 2015/0020627 A1 | * | 1/2015 | Palfai | F02B 75/28 74/421 R |

* cited by examiner

*Primary Examiner* — Jake Cook
(74) *Attorney, Agent, or Firm* — Harness, Dickey & Pierce, P.L.C.

(57) ABSTRACT

A transmission can include a first gear, a shaft, a second gear, a third gear and a first biasing member. The first gear can be disposed about a first rotational axis. The shaft can be disposed about a second rotational axis. The second gear can be fixedly coupled to the shaft and can be configured to meshingly engage the first gear. The third gear can be non-rotatably coupled to the shaft. The third gear can be axially slidable along the shaft and can be configured to meshingly engage the first gear. The first biasing member can bias the third gear axially away from the second gear and into engagement with the first gear.

20 Claims, 5 Drawing Sheets

TRANSMISSION WITH PINION FOR REDUCED BACKLASH

FIELD

The present disclosure relates to a transmission with a pinion for reduced backlash.

BACKGROUND

This section provides background information related to the present disclosure which is not necessarily prior art.

Mechanical transmissions typically include an input shaft fixed to an input gear that is meshingly engaged to an output gear fixed to an output shaft in order to transmit torque between the input and output shafts. The geometry of the gear teeth, tolerances, and/or wear of the gear teeth can result in backlash or play between the input and output gears. Backlash between the input and output gears can result in undesirable noise, vibration, and/or harshness ("NVH") during load cycling of the transmission or when reversing the rotational direction of the input shaft, as the backlash must be taken up before torque can be transferred between the input and output gears. In vehicles which employ an electric motor for propulsive power or for torque vectoring, the electric motor typically is drivingly coupled to a mechanical transmission to provide torque thereto on an as-needed basis. The electric motor can be operated in an intermittent fashion and can frequently change rotational direction (e.g. based on tractive need and/or whether the vehicle is making a right or left turn), which can result in undesirable NVH due to backlash in the mechanical transmission.

SUMMARY

This section provides a general summary of the disclosure, and is not a comprehensive disclosure of its full scope or all of its features.

The present teachings provide for a transmission including a first gear, a shaft, a second gear, a third gear and a first biasing member. The first gear can be disposed about a first rotational axis. The shaft can be disposed about a second rotational axis. The second gear can be fixedly coupled to the shaft and can be configured to meshingly engage the first gear. The third gear can be non-rotatably coupled to the shaft. The third gear can be axially slidable along the shaft and can be configured to meshingly engage the first gear. The first biasing member can bias the third gear axially away from the second gear and into engagement with the first gear.

The present teaching further provide for a transmission including a first output member, an input member, a second output member and a first biasing member. The first output member can be disposed about a first rotational axis and can define a first set of teeth. The input member can define a second set of teeth that can be configured to meshingly engage the first set of teeth. The second output member can be coupled to the first output member for common rotation about the first rotational axis and can define a third set of teeth that can be configured to meshingly engage the second set of teeth. The second output member can be moveable along the first rotational axis relative to the first output member between a first position and a second position. In the second position the first and third sets of teeth can be axially spaced apart a greater distance than when in the first position. The first biasing member can bias the second output member toward the second position and into engagement with the second set of teeth.

The present teachings further provide for a transmission including a first gear, an output member, a second gear, a third gear and a first biasing member. The first gear can be disposed about a first rotational axis. The output member can be disposed about a second rotational axis. The second gear can be fixedly coupled to the output member and can be configured to meshingly engage the first gear. The third gear can be coupled to the output member for common rotation about the second rotational axis. The third gear can be configured to meshingly engage the first gear and can be axially slidable along the output member between a first position and a second position. In the second position the second and third gears can be axially spaced apart a greater distance than when in the first position. The first biasing member can bias the third gear toward one of the first and second positions and into engagement with the first gear. The second gear, the third gear, and the output member can define a first chamber. The first chamber can be configured to hold a volume of fluid and can have a greater volume when the third gear is in the second position than when the third gear is in the first position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 diagrammatically illustrates a cross-sectional view of an example of a transmission constructed in accordance with the present teachings;

Corresponding reference numerals indicate corresponding parts throughout the several views of the drawings.

DETAILED DESCRIPTION

Example embodiments will now be described more fully with reference to the accompanying drawings.

Figure 1:
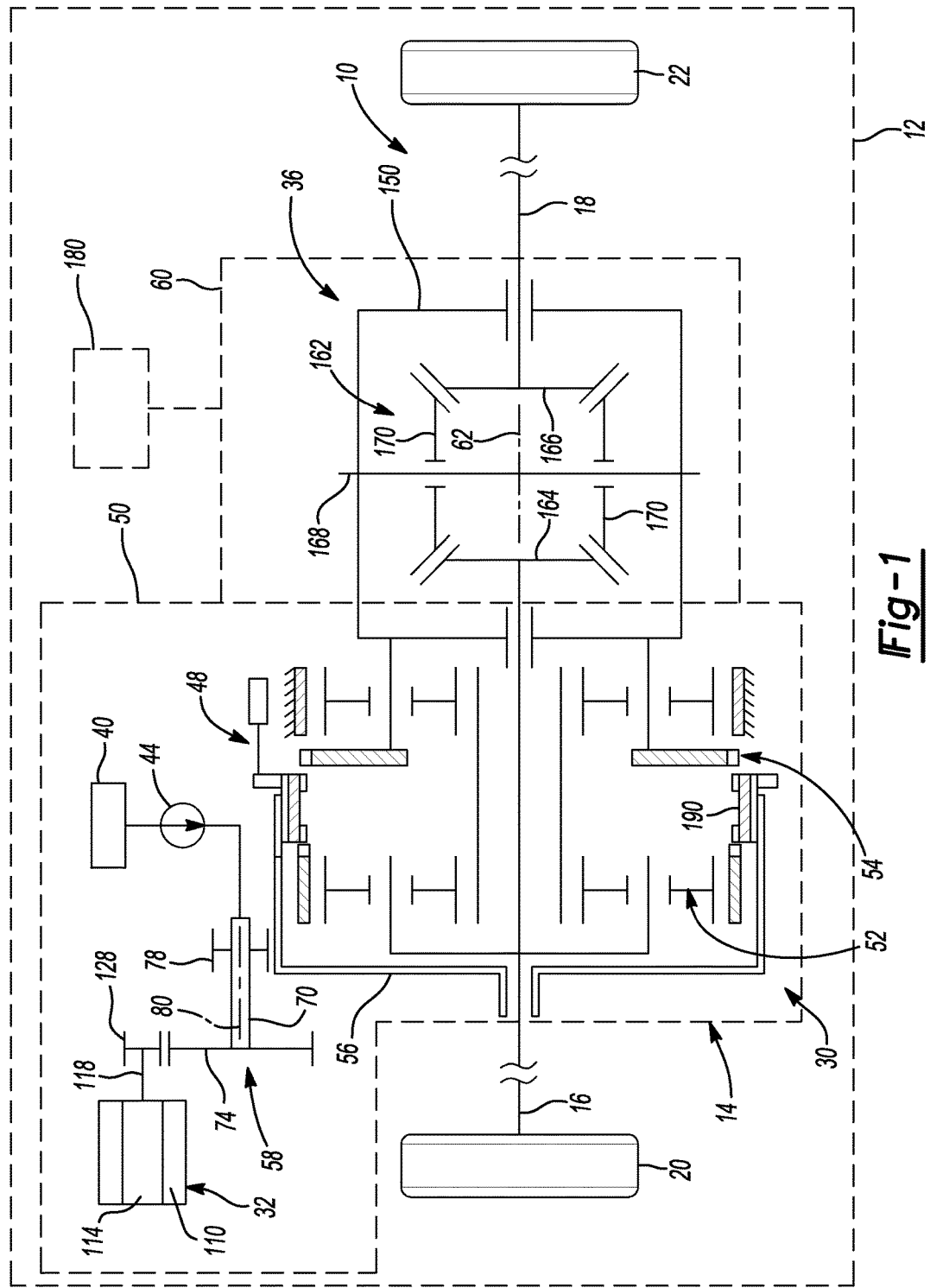

With reference to FIG. 1, an axle assembly (e.g. drive module) constructed in accordance with the teachings of the present disclosure is generally indicated by reference numeral 10. By way of example, the axle assembly 10 can be constructed in accordance with U.S. Pat. No. 8,663,051, or in accordance with U.S. Patent Application Publication No. 2014/0364264, the disclosures of which are incorporated by reference herein. The axle assembly 10 could be a front axle assembly or a rear axle assembly of a vehicle 12 for example. The axle assembly 10 can include a torque distribution drive mechanism or transmission 14, a first transmission output 16, a second transmission output 18, a left wheel 20, and a right wheel 22. The drive mechanism 14 may be used for transmitting torque to the first transmission output 16 and the second transmission output 18, which are illustrated as being first and second axle shafts, respectively, in the present example. For example, the first transmission output 16 may be coupled to the left wheel 20 and the second transmission output 18 may be coupled to the right wheel 22 of the axle assembly 10. In the particular example provided, the drive mechanism 14 may be selectively operable in a plurality of operational modes including a torque vectoring mode, a propulsion mode (i.e. drive or equal torque mode) and a neutral mode, where the torque vectoring mode can be used to generate a torque difference between the first and second transmission outputs 16 and 18.

The torque distribution drive mechanism 14 can include a transmission gear set 30, a drive member 32, and a differential assembly 36. The drive mechanism 14 can also include a fluid reservoir 40, a pump 44, and an actuator 48. The transmission gear set 30 can be disposed within a transmission housing 50 that can be non-rotatably coupled to a differential housing 60 that can house the differential assembly 36. In the example provided, the transmission gear set 30 is a dual planetary gear set, though other configurations can be used. In the example provided, the transmission gear set 30 includes a first planetary gear set 52, a second planetary gear set 54, an input member 56, and an intermediate gear set 58. The first and second planetary gear sets 52, 54 can be co-axially mounted with respect to the first and second transmission outputs 16 and 18 and/or the differential assembly 36 (i.e. about a first axis 62). The first and second gear sets 52, 54 and the actuator 48 can be constructed in any suitable manner, such as that described in U.S. Pat. No. 8,663,051 or U.S. Patent Application Publication No. 2014/0364264 for example. The intermediate gear set 58 can include an intermediate shaft 70, an intermediate input 74, and an intermediate output 78. The intermediate shaft 70 can be supported within the transmission housing 50 for rotation about a second axis 80 by any suitable means, such as one or more bearings (not shown) for example. In the example provided, the second axis 80 is offset from and parallel to the first axis 62, though other configurations can be used. The reservoir 40 can be configured to hold a fluid (e.g. a lubricant fluid) and the pump 44 can be fluidly coupled to the reservoir 40 and the intermediate shaft 70 to provide the fluid to the intermediate shaft 70 as will be discussed below. The reservoir 40 can be fixedly coupled to the transmission housing 50 or can be integrally formed therewith. The pump 44 can be any type of pump and, while not specifically shown, the pump 44 can be driven by the drive member 32. The intermediate input 74 and intermediate output 78 can be non-rotatably coupled to the intermediate shaft 70 for common rotation with the intermediate shaft 70 about the second axis 80. In the example provided, the intermediate gear set 58 is a reduction gear set, such that the intermediate input 74 has a larger diameter than the intermediate output 78. It will be appreciated that the intermediate input 74 could be a smaller diameter than the intermediate output 78, or that the intermediate input 74 and intermediate output 78 could have identical diameters, wherein the intermediate gear set 58 can be an idler gear set.

The intermediate output 78 can meshingly engage the input member 56. The input member 56 can transmit rotary power from the intermediate gear set 58 to a transmission input of the first or second planetary gear sets 52, 54 or the differential assembly 36. In the example provided, the input member 56 is rotatable along the common longitudinal axis of the transmission outputs 16, 18 (i.e. first axis 62), though other configurations can be used. While the intermediate gear set 58 is illustrated and described as a single stage reduction gear set, it is understood that additional reduction gear stages can be included.

The drive member 32 can be any means for providing a rotary input to the transmission gear set 30, such as an electric or hydraulic motor or an engine. In the example provided, the drive member 32 is an electric motor having a stator 110, a rotor 114, and an output shaft 118. In the example provided, the drive member 32 is a reversible electric motor capable of providing torque in either rotational direction about the rotational axis of the output shaft 118. The stator 110 can be non-rotatably mounted to the transmission housing 50. The rotor 114 can be rotatably disposed within the stator 110. The output shaft 118 can be fixedly coupled to the rotor 114 for common rotation relative to the stator 110. The output shaft 118 can include a drive output 128. The drive output 128 can be non-rotatably coupled to the output shaft 118 and can meshingly engage the intermediate input 74 to provide torque to the intermediate gear set 58.

In addition to the differential housing 60, the differential assembly 36 can include a differential carrier 150 and a means for transmitting rotary power from the differential carrier 150 to the first and second transmission outputs 16 and 18. In the particular example provided, the rotary power transmitting means includes a differential gear set 162 that is housed in the differential carrier 150 and which can have a first side gear 164, a second side gear 166, a cross-pin 168 and a plurality of pinion gears 170. The first and second side gears 164 and 166 can be rotatably disposed about the rotational axis of the differential carrier 150 (e.g. axis 62). The first transmission output 16 can be drivingly coupled to the first side gear 164 (e.g. fixedly coupled for common rotation), while the second transmission output 18 can be drivingly coupled to the second side gear 166 (e.g. fixedly coupled for common rotation). The cross-pin 168 can be mounted to the differential carrier 150 generally perpendicular to the rotational axis of the differential carrier 150. The pinion gears 170 can be rotatably mounted on the cross-pin 168 and meshingly engaged with the first and second side gears 164 and 166. While the differential assembly 36 has been illustrated as employing bevel pinions and side gears, it will be appreciated that other types of differential mechanisms could be employed, including differential mechanisms that employ helical pinion and side gears or planetary gear sets for example.

Optionally, the differential assembly 36 may be coupled to a main or primary drive of the vehicle 12. In the particular example provided, the primary drive of the vehicle includes an engine 180 (e.g. an internal combustion engine) that is employed to drive the differential assembly 36. In this regard, rotary power produced by the engine 180 can be transmitted in a conventional manner to the differential carrier 150 to drive the first and second transmission outputs 16 and 18 (i.e. via the differential carrier 150 and the differential gear set 162). In this way, the drive member 32 may serve as a complement to the primary drive of the vehicle 12 as described in U.S. Pat. No. 8,663,051 or U.S. Patent Application Publication No. 2014/0364264.

The actuator 48 can be employed to control the operational state of the drive mechanism 14 (e.g. switching between the neutral, propulsion, or torque vectoring modes as described in greater detail in U.S. Pat. No. 8,663,051 or U.S. Patent Application Publication No. 2014/0364264). In the particular example provided, the actuator 48 can include a shift sleeve 190 that can be axially moved to selectively engage the first planetary gear set 52 to provide torque vectoring, the differential carrier 150 to provide propulsion, or neither (e.g. a neutral mode), though other configurations can be used.

For example, in the torque vectoring mode, the drive member 32 may be selectively activated in either rotational direction to generate a torque difference between the first and second side gears 164 and 166, which is communicated to the left and the right wheels 20 and 22, respectively, through the first and second transmission outputs 16 and 18, respectively. In configurations where the optional primary drive (e.g. engine 180) is included, and the drive member 32 is activated when rotary power is transmitted from the primary drive to the differential assembly 36, the torque transmitted by the drive mechanism 14 can act as an offset torque which is superposed to the input torque transmitted to the axle assembly 10 from the primary drive.

As an example, the drive mechanism 14 may subtract a torque from the left wheel 20 and add a corresponding torque to the right wheel 22 when the motorized vehicle 12 turns left, and may subtract a torque from the right wheel 22 and add a corresponding torque to the left wheel 20 when the motorized vehicle 12 turns right to improve the turning behavior of the vehicle 12 and decrease its turning radius. The drive member 32 can be activated (e.g., automatically or on an as-needed basis) when the vehicle 12 turns, and can rotate in one rotational direction when the vehicle 12 turns left while rotating the opposite rotational direction when the vehicle 12 turns right.

During straight forward driving, the drive member 32 can be non-activated to permit the wheels 20, 22 to rotate freely, or in the configuration where the optional primary drive (i.e. engine 180) transmits rotary power to the differential assembly 36, the vehicle 12 can be propelled in a forward direction by the engine 180. In such a situation, the differential assembly 36, which receives the input torque from the engine 180, transmits a substantially equal torque to the first transmission output 16 and the second transmission output 18.

In the propulsion mode, the shift sleeve 190 can be positioned in a second position to couple the input member 56 to the differential assembly 36 such that rotary power provided by the drive member 32 is input to the differential carrier 150 and applied to the first and second transmission outputs 16 and 18 via the differential assembly 36. It is appreciated that rotary power provided by the drive member 32 when the drive mechanism 14 is operated in the propulsion mode is employed for propulsive power to propel (or aid in propelling) the vehicle 12. It is also appreciated that where the optional primary drive (i.e. engine 180) is included and the drive mechanism 14 is operated in the propulsion mode, rotary power provided by the drive member 32 adds to the torque provided by the engine 180 to the differential carrier 150 to aid in propelling the vehicle 12. In the neutral mode, the shift sleeve 190 can uncouple the input member 56 from the first and second planetary gear sets 52, 54 and the differential carrier 150.

Figure 2:
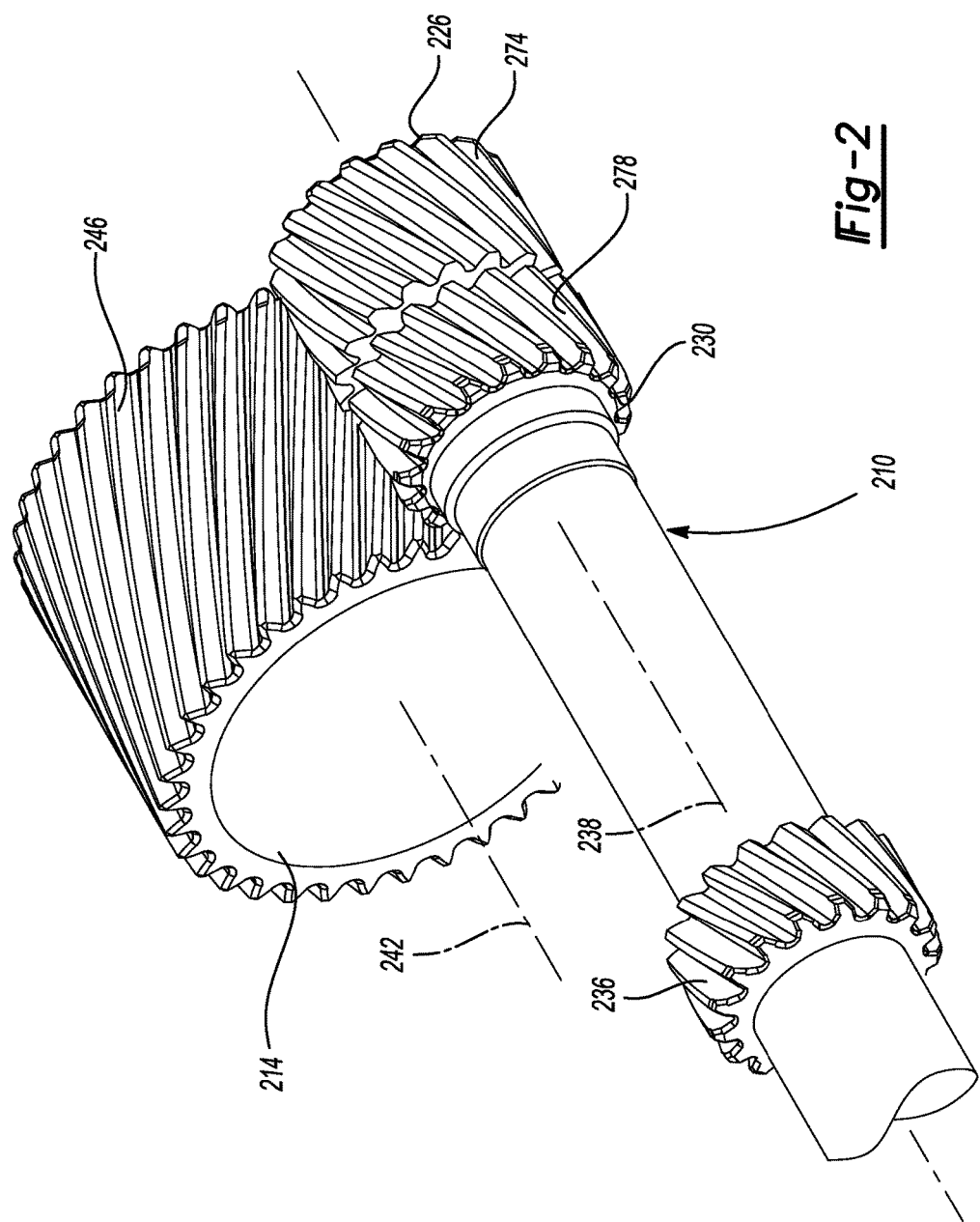
FIG. 2 is a perspective view of a first construction of an input member and an output member of a transmission such as the transmission of FIG. 1.
Figure 3:
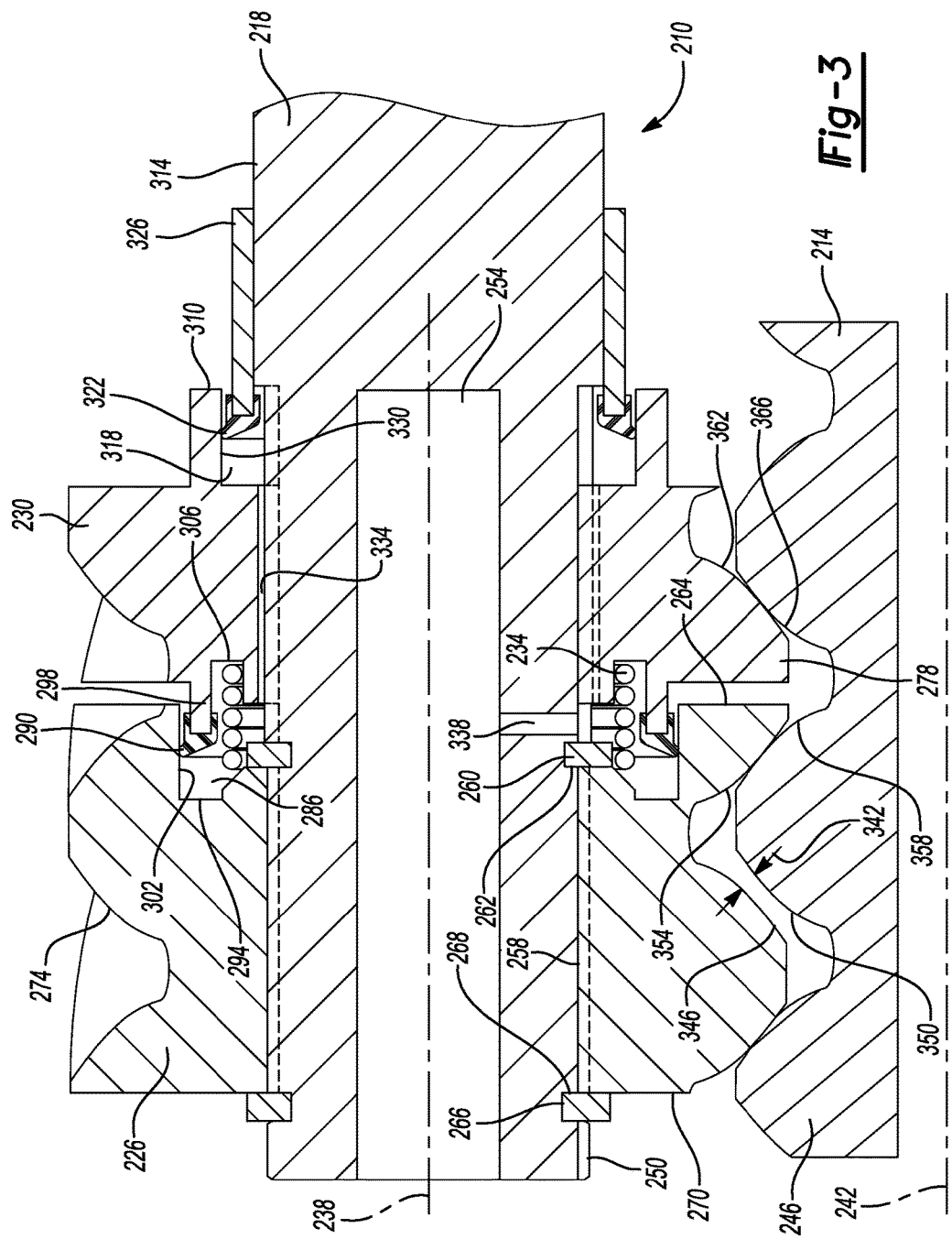
FIG. 3 is a cross-sectional view of the input and output members of FIG. 2 taken along line 3-3 of FIG. 2.

With reference to FIGS. 2 and 3, an output pinion 210 and an input member 214 of a first construction are illustrated. The output pinion 210 can have an output shaft 218, a first output gear 226, a second output gear 230 and a first biasing member 234. The output pinion 210 can also include a pinion input 236. The output shaft 218 can be disposed about a rotational axis 238 and the input member 214 can be disposed about a rotational axis 242 that can be parallel to and offset from axis 238. The input member 214 can include a plurality of teeth 246. The teeth 246 of the input member 214 can be external helical teeth.

The output shaft 218 can include a plurality of external splines 250 and a central bore 254. The pinion input 236 can be coupled to the output shaft 218 for common rotation with the output shaft 218. The first output gear 226 can include a plurality of internal splines 258 meshingly engaged with the external splines 250 to non-rotatably couple the first output gear 226 to the output shaft 218. The first output gear 226 can be axially fixed relative to the output shaft 218. In the example provided, a first C-ring 260 is received in a first groove 262 that is disposed about the output shaft 218 proximate to a first side 264 of the first output gear 226, and a second C-ring 266 is received in a second groove 268 that is disposed about the output shaft 218 proximate to a second side 270 of the first output gear 226 to restrict axial movement of the second output gear 226. It is understood that the first output gear 226 can be axially fixed to the output shaft 218 by other means or can be integrally formed with the output shaft 218. The first output gear 226 can have a plurality of external teeth 274 that can meshingly engage with the teeth 246 of the input member 214.

The second output gear 230 can include a plurality of external teeth 278 and a plurality of internal splines 282. The external teeth 278 can meshingly engage the teeth 246 of the input member 214. The internal splines 282 can be meshingly engaged with the external splines 250 to non-rotatably couple the second output gear 230 to the output shaft 218. The teeth 274 of the first output gear 226 can be the same profile as the teeth 278 of the second output gear 230. The second output gear 230 can be axially moveable along the output shaft 218 between a first position and a second position wherein the teeth 278 of the second output gear 230 are axially spaced apart from the teeth 274 of the first output gear 226 a greater distance than when in the first position. The biasing member 234 can bias the second output gear 230 toward the second position. In the example provided, the biasing member 234 is a coil spring disposed axially between the first and second output gears 226, 230.

The first and second output gears 226, 230 can define a first fluid chamber 286. In the example provided, the first biasing member 234 is received in the first fluid chamber 286. A first seal 290 can be disposed between the first and second output gears 226, 230 to prevent fluid from escaping the first fluid chamber 286 between the first and second output gears 226, 230. In the example provided, the first output gear 226 defines a first cavity 294 that is open at the first side 264 and the second output gear 230 includes a first lip 298 that extends axially into the first cavity 294. In the example provided, the first seal 290 is a lip seal that is mounted to the first lip 298 and extends radially outward to seal between the first lip 298 and an inner surface 302 of the first cavity 294. It is understood that other configurations can be used. For example, the lip seal could be fixedly coupled to the first output gear 226, or the first output gear 226 could include a lip that is received in a first cavity of the second output gear 230.

The second output gear 230 can also define a spring recess 306 and a second lip 310. The spring recess 306 can be radially inward of the first lip 298 and receives a portion of the biasing member 234 to locate the biasing member 234 coaxially with the output shaft 218. The second lip 310 can extend axially from a side of the second output gear 230 opposite from the first lip 298. The second lip 310 can be radially outward of and axially overlap with an outer surface 314 of the output shaft 218 to define a second fluid chamber 318. The output shaft 218 at the outer surface 314 can be smooth (i.e. not include the external splines 250). A second seal 322 can seal between the second lip 310 and the output shaft 218 to prevent fluid from escaping the second fluid chamber 318 between the second output gear 230 and the output shaft 218. In the example provided, a first ring 326 is press fit about the outer surface 314 and extends axially over a portion of the external splines 250 to be radially between the second lip 310 and the external splines 250. The second seal 322 can be mounted to the first ring 326 to seal with an inner surface 330 of the second lip 310. It is understood that other configurations can be used. For example, a lip seal could be mounted to the second lip 310 to seal on an outer surface of the first ring 326, or to seal directly to the outer surface 314 of the output member 218.

The internal splines 282 of the second output gear 230 and the external splines 250 of the output shaft 218 can define a plurality of passageways 334 that can fluidly couple the first and second fluid chambers 286, 318. The internal splines 258 of the first output gear 226 can be configured to prevent fluid from escaping the first fluid chamber 286 between the output shaft 218 and the first output gear 230. The central bore 254 can extend through at least a portion of the center of the output shaft 218 and be configured to receive fluid therein. The central bore 254 can be fluidly coupled to a reservoir (e.g reservoir 40 shown in FIG. 1) that can provide fluid to the central bore 254 by gravity feed or by a pump (e.g. pump 44 shown in FIG. 1). The output shaft 218 can further define an aperture 338 that can extend radially outward from the central bore 254 to fluidly couple the central bore 254 with the first fluid chamber 286 and/or the second fluid chamber 318. While only one aperture 338 is illustrated, the output shaft 218 can define a plurality of the apertures 338.

Since the first output gear 226 is axially fixed to the output shaft 218, the first output gear 226 can transmit high torque loads between the output shaft 218 and the input member 214. Due to tolerances between the first output gear 226 and the input member 214, an amount of backlash 342 or spacing can exist between non-engaged surfaces of the teeth 246, 274. In the example provided, the teeth 246, 274 are configured such that rotation of the output shaft 218 in one rotational direction will cause backlash 342 between a first surface 346 of teeth 274 and a second surface 350 of teeth 246, while rotation of the output shaft 218 in the opposite rotational direction will cause backlash (not specifically shown) between a third surface 354 of teeth 274 and a fourth surface 358 of teeth 246.

The backlash 342 must be taken up when torque is to be transferred between the non-engaged surfaces (e.g. first and second surfaces 346, 350). The biasing member 234 can bias a fifth surface 362 of the second output gear 230 into contact with a sixth surface 366 of one or more of the teeth 246 of the input member 214. The fourth surface 358 and sixth surface sixth surface 366 can be on axially adjacent teeth 246 and can generally oppose each other such that the portions of the teeth 274 and 278 that engage the input member 214 can be meshingly received between the same two adjacent ones of the teeth 246. Thus, when torque is to be transferred between the non-engaged surfaces (e.g. between first and second surfaces 346, 350 when the rotational direction of the output shaft 218 changes) an amount of initial torque can be transferred between the input member 214 and the output shaft 218 through the second output gear 230 as the backlash 342 is taken up. As the backlash 342 is taken up, the second output gear 230 can move axially toward the first output gear 226 until the first output gear 226 engages the input member 214.

The biasing member 234 can resist movement of the second output gear 230 toward the first output gear 226. Movement of the second output gear 230 toward the first output gear 226 can also reduce the volume of the first fluid chamber 286, while increasing the volume of the second fluid chamber 318. The fluid within the first fluid chamber 286 can be forced through the passageways 334 to the second fluid chamber 318 and can be forced through the aperture 338 to the central bore 254. Viscous forces of the flowing fluid through the passageways 334 and/or the aperture 338, as well as frictional forces between the internal and external splines 282, 250, can resist the axial movement of the second output gear 230 and have a damping effect on the biasing member 234. The number and size of the apertures 338 can be selected based on the specific application such that fluid flowing between the first and/or second fluid chambers 286, 318 and the central bore 254 can provide desired resistance and/or damping effect. The size of the internal and external splines 282, 250 can also be determined based on the specific application, such that friction between the internal and external splines 282, 250 and/or viscous forces from fluid flow through the passageways 334 can provide desired resistance and/or damping characteristics. Thus, the second output gear 230 can remain in constant contact with the second surface 350 of the teeth 246 of the input member 214. In this way, torque can be transferred between the input member 214 and the output shaft 218 while the backlash 342 between the input member 214 and the first output gear 226 is taken up in a controlled manner that can reduce backlash related NVH.

The output pinion 210 and input member 214 can be used in any suitable transmission to reduce backlash between input and output gear teeth. For example, the output pinion 210 can be used in the drive mechanism 14 (FIG. 1) in place of the intermediate gear set 58 (FIG. 1). In such a configuration, the output shaft 218 can correspond to the intermediate shaft 70 (FIG. 1), the pinion input 236 can correspond to the intermediate input 74 (FIG. 1), the first and second output gears 226, 230 can correspond to the intermediate output 78 (FIG. 1), and the input member 214 can correspond to the input member 56 (FIG. 1). In this configuration, the pinion input 236 can meshingly engage with the drive output 128 (FIG. 1) such that output shaft 218 can receive input torque from the drive member 32 (FIG. 1). The input member 214 can be drivingly coupled to a transmission input of the first or second planetary gear sets 52, 54 (FIG. 1) or the differential assembly 36 (FIG. 1). Thus, the output shaft 218 can transmit propulsive or torque vectoring power to the first and second transmission outputs 16, 18 (FIG. 1).

In an alternative configuration, the first and second output gears 226, 230 can correspond to the intermediate input 74 (FIG. 1), the pinion input 236 can correspond to the intermediate output 78 (FIG. 1), and the input member 214 can correspond to the drive output 128 (FIG. 1). In such a configuration, the input member 214 can be non-rotatably coupled to the output shaft 118 (FIG. 1) and the pinion input 236 can meshingly engage the input member 56 (FIG. 1). Thus, the output shaft 218 can receive torque from the drive member 32 (FIG. 1) via the input member 214 and the first and second output gears 226, 230 and torque can be transferred from the output shaft 218 to first and second planetary gear sets 52, 54 (FIG. 1) via the pinion input 236.

It is understood that the output pinion 210 and input member 214 can alternatively correspond to different meshingly engaged elements of a transmission. For example, the output shaft 218 can correspond to the output shaft 118 (FIG. 1) of the drive member 32 (FIG. 1), the first and second output gears 226, 230 can correspond to the drive output 128 (FIG. 1), and the input member 214 can correspond to the intermediate input 74 (FIG. 1). It is understood that in this configuration, the output pinion 210 can lack the pinion input 236, as the pinion shaft 218 can be non-rotatably coupled to the rotor 114 (FIG. 1) of the drive member 32 (FIG. 1) to receive torque therefrom. In this configuration, the input member 214 can be non-rotatably coupled to the intermediate shaft 70 (FIG. 1) and torque can be transferred from the pinion shaft 218 to the transmission gear set 30 (FIG. 1) via the first and second output gears 226, 230 and the input member 214.

Figure 4:
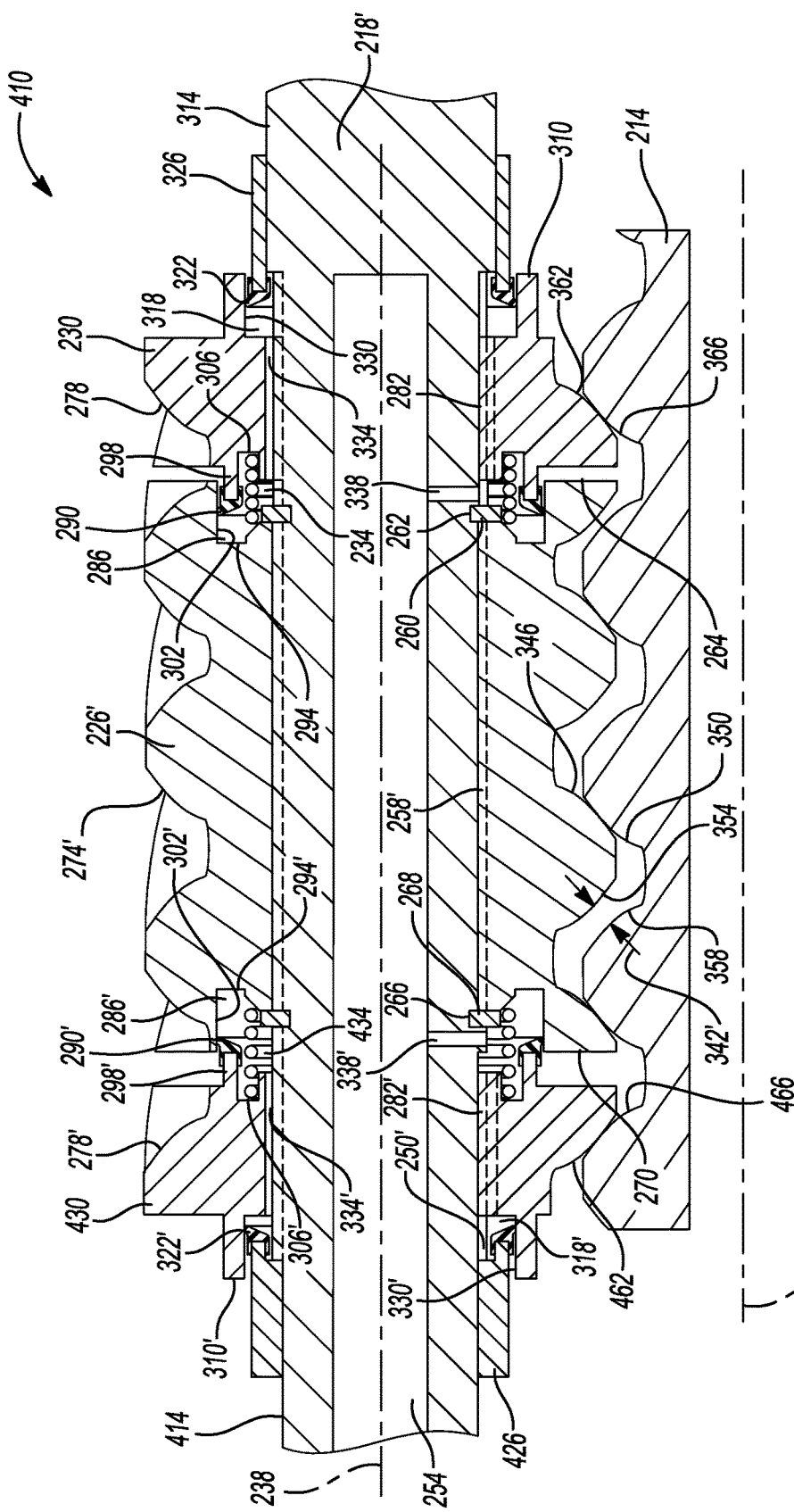
FIG. 4 is a cross-sectional view similar to FIG. 3, illustrating an input member and an output member of a second construction.

With reference to FIG. 4, a sectional view of a portion of an output pinion 410 of a second construction is illustrated. The output pinion 410 can be similar to the output pinion 210, as described above with reference to FIGS. 2 and 3, except as shown and otherwise described herein. The output pinion 410 can include an output shaft 218', a first output gear 226', the second output gear 230, the first biasing member 234, a third output gear 430, a second biasing member 434, and the pinion input 236 (FIG. 2). Primed reference numerals indicate similar elements to corresponding non-primed reference numerals and only differences will be described. For example, the first output gear 226' can be similar to the first output gear 226 (FIGS. 2 and 3) except that second side 270' can be constructed similar to first side 264. For example, the first output gear 226' can define the first cavity 294 that is open to the first side 264 and a similar cavity 294' that is open to the second side 270'.

The third output gear 430 and second biasing member 434 can be similar to the second output gear 230 and the first biasing member 234, respectively, except that the third output gear 434 can be disposed on the opposite side of the first output gear 226' (e.g. second side 270'). The second biasing member 434 can bias the third output gear 430 axially away from the second side 270' of the first output gear 226'.

In the example provided, the output shaft 218' can include a second outer surface 414 at an end of the output shaft 218' that is proximate to the third output gear 430 (i.e. axially opposite the outer surface 314). The second outer surface 414 can have a diameter that is less than the minimum diameter of the internal splines 258, 282, 282', such that the first, second, and third output gears 226', 230, 430 can be assembled onto the output shaft 218' from one side, though other configurations can be used.

The second lip 310' can extend axially from a side of the third output gear 230' that is opposite from the first lip 298' and the first output gear 226'. The second lip 310' can be radially outward of and axially overlap with the second outer surface 414 of the output shaft 218' to define the second fluid chamber 318'. The output shaft 218' at the second outer surface 414 can be smooth (i.e. not include the external splines 250). The second seal 322' of the third output gear 430 can seal between the second lip 310' and the output shaft 218' to prevent fluid from escaping the second fluid chamber 318' between the third output gear 430 and the output shaft 218'. In the example provided, a second ring 426 can be press fit about the second outer surface 414 and can extend axially over a portion of the external splines 250' to be radially between the external splines 250' and the second lip 310' of the third output gear 430. The second seal 322' of the third output gear 430 can be mounted to the second ring 426 to seal with the inner surface 330' of the second lip 310'. It is understood that other configurations can be used. For example, a lip seal could be mounted to the second lip 310' to seal on an outer surface of the second ring 426, or to seal directly to the second outer surface 414 of the output member 218'.

In this construction, the first biasing member 234 can bias the second output gear 230 into constant contact with the fourth surface 358 of the input member 214, and the second biasing member 434 can bias a seventh surface 462 of the third output gear 430 into constant contact with an eighth surface 466 of the input member 214 that faces an opposite axial direction to the sixth surface 366. The portions of the teeth 274' and 278' that engage the input member 214 can be meshingly received between the same two adjacent ones of the teeth 246. The second biasing member 434 and third output gear 430 can operate similarly to the first biasing member 234 and the second output gear 230 to transfer torque between the input member 214 and the output shaft 218', while backlash between the third surface 354' of teeth 274' and the fourth surface 358 of teeth 246 is taken up. Thus, the output pinion 410 can reduce backlash related NVH regardless of rotational direction or relative rotational positions of the input member 214 and the output pinion 410.

Figure 5:
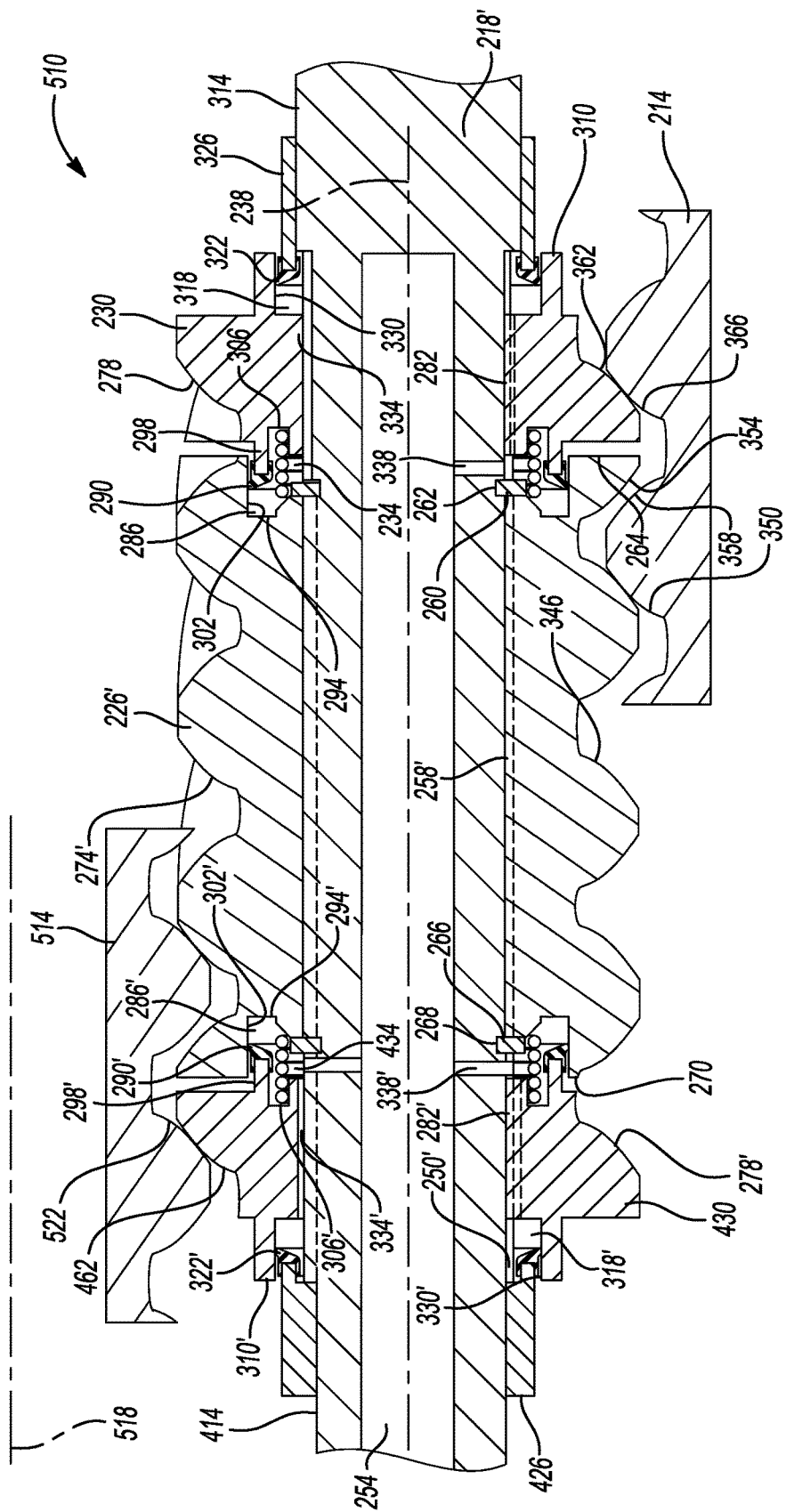
FIG. 5 is a cross-sectional view similar to FIG. 4, illustrating an input member and an output member of a third construction.

With reference to FIG. 5, a sectional view of a portion of an output pinion 510 of a third construction is illustrated. The output pinion 510 can be similar to the output pinion 410 (FIG. 4) except as shown and otherwise described herein. In this construction, the input member 214 can be configured to engage only the first output gear 226' and the second output gear 230 as described above, while a second input member 514 can be configured to engage the first output gear 226' and the third output gear 430. The second input member 514 can be disposed about a third axis 518 that can be parallel to and offset from the first and second axes 238, 242. For example, the second input member 514 can correspond to the drive output 128 (FIG. 1) and be non-rotatably coupled to the output shaft 118 (FIG. 1). In this configuration, the seventh surface 462 can engage a ninth surface 522 of the second input member 514 that faces an opposite axial direction to the sixth surface 366. The portions of the teeth 274' and 278' that engage the second input member 514 can be meshingly received between the same two adjacent ones of the teeth of the second input member 514. It is appreciated that the output pinion 510 can act as an idler shaft between the input member 214 and the second input member 514 and can reduce backlash NVH in both rotational directions.

In a similar construction, not specifically shown, the teeth 278' of the third output gear 430 and the portion of the teeth 274 of the first output gear 226' that engages the second input member 514 can be a different diameter than the teeth 278 of the second output gear 230 and the portion of the teeth 274 of the first output gear 226 that engages the input member 214. In such a construction, the output pinion 510 can operate as a reduction gear between the input member 214 and the second input member 514.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on," "connected to," or "coupled to" another element or layer, it may be directly on, connected or coupled to the other element or layer, or intervening elements or layers may be present. In contrast, when an element is referred to as being "directly on," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "input", "output", "inner," "outer," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the propagation direction of torque through the device in the figures is reversed, elements described as "inputs" would then be oriented as "outputs" to other elements or features. Thus, the example terms "input" or "output" can encompass both orientations or operations.

What is claimed is:

1. A transmission comprising:
   a first gear disposed about a first rotational axis;
   a shaft disposed about a second rotational axis;
   a second gear fixedly coupled to the shaft such that the second gear is axially and rotationally fixed relative to the shaft, the second gear being configured to meshingly engage the first gear;
   a third gear non-rotatably coupled to the shaft, the third gear being axially slidable along the shaft and configured to meshingly engage the first gear; and
   a first biasing member biasing the third gear axially away from the second gear and into engagement with the first gear.

2. The transmission of claim 1, wherein the first biasing member is disposed between the second and third gears.

3. The transmission of claim 1, wherein the second gear, the third gear, and the shaft define a first chamber that has a first volume when the third gear is in a first axial position and a second volume when the third gear is in a second axial position.

4. The transmission of claim 3, wherein the third gear and the shaft define a second chamber spaced apart from the first chamber and in fluid communication with the first chamber.

5. The transmission of claim 4, wherein the shaft defines a plurality of external splines and the third gear defines a plurality of internal splines that are meshingly engaged with the external splines of the shaft, the internal and external splines defining at least one passage that fluidly couples the first and second chambers.

6. The transmission of claim 3, wherein the shaft defines an internal bore and an aperture, the aperture fluidly coupling the internal bore with the first chamber.

7. The transmission of claim 3, wherein the first biasing member is received in the first chamber.

8. The transmission of claim 1, further comprising:
   a fourth gear non-rotatably coupled to the shaft and axially slidable along the shaft, the second gear being located axially between the third and fourth gears; and
   a second biasing member configured to bias the fourth gear axially away from the second gear.

9. The transmission of claim 8, wherein the fourth gear is configured to meshingly engage the first gear.

10. The transmission of claim 8, further comprising a fifth gear disposed about a third rotational axis, the fifth gear being configured to meshingly engage the fourth gear.

11. A transmission comprising:
    a first output shaft disposed about a first rotational axis;
    a first output gear that is axially and rotationally fixed relative to the first output shaft, the first output gear defining a first set of teeth;
    an input member defining a second set of teeth that are configured to meshingly engage the first set of teeth;
    a second output gear that is non-rotatably coupled to the first output shaft for common rotation about the first rotational axis, the second output gear defining a third set of teeth that are configured to meshingly engage the second set of teeth, the second output gear being moveable along the first rotational axis relative to the first output shaft between a first position and a second position wherein the first and third sets of teeth are axially spaced apart a greater distance than when in the first position; and
    a first biasing member biasing the second output gear toward the second position and into engagement with the second set of teeth.

12. The transmission of claim 11, wherein the first output shaft and the second output gear define a first chamber, the first chamber having a first volume when the second output gear is in the first position and a second volume when the second output gear is in the second position.

13. The transmission of claim 12, wherein the first output shaft and the second output gear define a second chamber that is spaced apart from the first chamber, the second chamber having a third volume when the second output gear is in the first position and a fourth volume when the second output gear is in the second position.

14. The transmission of claim 13, wherein the first volume is less than the second volume, and the third volume is less than the fourth volume.

15. The transmission of claim 12, wherein the first output shaft includes a tube member disposed about the first rotational axis, the tube member defining an aperture that fluidly couples an interior of the tube member with the first chamber.

16. The transmission of claim 11, further comprising:
a third output gear, the third output gear being coupled to the first output shaft for common rotation about the first rotational axis and defining a fourth set of teeth that are configured to meshingly engage the second set of teeth, the first set of teeth being disposed axially between the third and fourth sets of teeth, the third output gear being moveable along the first rotational axis relative to the first output shaft between a third position and a fourth position wherein the first and fourth sets of teeth are axially spaced apart a greater distance than when in the third position; and
a second biasing member configured to bias the third output gear toward the fourth position.

17. A transmission comprising:
a first gear disposed about a first rotational axis;
an output member disposed about a second rotational axis;
a second gear fixedly coupled to the output member such that the second gear is axially and rotationally fixed relative to the output member, the second gear being configured to meshingly engage the first gear;
a third gear non-rotatably coupled to the output member for common rotation about the second rotational axis, the third gear being configured to meshingly engage the first gear and being axially slidable along the output member between a first position and a second position wherein the second and third gears are axially spaced apart a greater distance than when in the first position; and
a first biasing member biasing the third gear toward one of the first and second positions and into engagement with the first gear;
wherein the second gear, the third gear, and the output member define a first chamber, the first chamber being configured to hold a volume of fluid and having a greater volume when the third gear is in the second position than when the third gear is in the first position.

18. The transmission of claim 17, further comprising:
a fourth gear coupled to the output member for common rotation about the second rotational axis, the fourth gear being configured to meshingly engage the first gear and being axially slidable along the output member between a third position and a fourth position wherein the second and fourth gears are axially spaced apart a greater distance than when in the third position; and
a second biasing member configured to bias the fourth gear toward the fourth position;
wherein the second gear, the fourth gear, and the output member define a second chamber, the second chamber having a greater volume when the fourth gear is in the fourth position than when the fourth gear is in the third position.

19. The transmission of claim 17, wherein the output member defines a central bore and an aperture, the aperture fluidly coupling the central bore with the first chamber.

20. The transmission of claim 17, further comprising:
a fourth gear coupled to the output member for common rotation about the second rotational axis, the fourth gear being axially slidable along the output member between a third position and a fourth position wherein the second and fourth gears are axially spaced apart a greater distance than when in the third position;
a second biasing member configured to bias the fourth gear toward the fourth position; and
a fifth gear disposed about a third rotational axis, the fifth gear being configured to meshingly engage the fourth gear;
wherein the second gear, the fourth gear, and the output member define a second chamber, the second chamber having a greater volume when the fourth gear is in the fourth position than when the fourth gear is in the third position.

* * * * *